(12) United States Patent
Schneider

(10) Patent No.: US 8,396,209 B2
(45) Date of Patent: *Mar. 12, 2013

(54) MECHANISM FOR CHAINED OUTPUT FEEDBACK ENCRYPTION

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/154,612

(22) Filed: May 23, 2008

(65) Prior Publication Data

US 2009/0323927 A1    Dec. 31, 2009

(51) Int. Cl.
*H04L 29/06* (2006.01)
(52) U.S. Cl. .......................................................... 380/28
(58) Field of Classification Search ...................... 380/28
See application file for complete search history.

(56) References Cited

U.S. PATENT DOCUMENTS

| | | | |
|---|---|---|---|
| 4,107,458 A * | 8/1978 | Constant | 380/37 |
| 5,195,136 A | 3/1993 | Hardy et al. | |
| 5,586,186 A * | 12/1996 | Yuval et al. | 380/30 |
| 5,673,319 A | 9/1997 | Bellare et al. | |
| 6,236,729 B1 | 5/2001 | Takaragi et al. | |
| 6,459,792 B2 | 10/2002 | Ohmori et al. | |
| 6,742,122 B1 | 5/2004 | Morishita | |
| 7,010,689 B1 | 3/2006 | Matyas et al. | |
| 2002/0025037 A1 | 2/2002 | Sano | |
| 2003/0059040 A1* | 3/2003 | Rose et al. | 380/1 |
| 2004/0161105 A1 | 8/2004 | Park et al. | |
| 2006/0088156 A1 | 4/2006 | Belenky et al. | |
| 2006/0126827 A1 | 6/2006 | Milleville | |
| 2007/0050696 A1* | 3/2007 | Piersol et al. | 715/500 |
| 2007/0053516 A1 | 3/2007 | Katoozi et al. | |
| 2007/0101130 A1 | 5/2007 | Tardo | |
| 2007/0189524 A1 | 8/2007 | Rogaway | |
| 2007/0230691 A1 | 10/2007 | Elhamias et al. | |
| 2007/0253549 A1* | 11/2007 | Celikkan et al. | 380/42 |
| 2008/0010449 A1 | 1/2008 | Holtzman et al. | |
| 2008/0123860 A1* | 5/2008 | Choi | 380/278 |
| 2009/0034715 A1 | 2/2009 | Ramasamy et al. | |
| 2009/0214026 A1 | 8/2009 | Gueron et al. | |

OTHER PUBLICATIONS

Tan. "The PLFG Parallel Pseudorandom Number Generator", Elsevier Science B.V. pp. 1-6. 2002.*
Dworkin. "Recommendation for Block Cipher Mode of Operation" NIST 2001. pp. 1-66.*
RSA Laboratories. "What is Output Feedback Mode". http://rsa.com/rsalabs/node.asp?id=2173. Oct. 20, 2007 Internet Archive Wayback Machine. pp. 1-2.*
Barker et al. Recommendation for Key Management—Part I: General. NIST Special Publication 800-57 Mar. 2007. pp. 1-142.*
Tan. "The PLFG parallel pseudorandom number generator" Feb. 2002 pp. 693-698. Future generation computer systems vol. 18 issue 5.*
Eng, Asgaut, "Cipher Block Chaining", 1 page, 1996. http://www.pvv.ntnu.no/~asgaut/crypto/thesis/node15.html.*
USPTO, Office Action for U.S. Appl. No. 12/116,485 mailed on Apr. 13, 2011.
USPTO, Final Office Action for U.S. Appl. No. 12/116,485 mailed on Nov. 1, 2011.
USPTO, Advisory Action for U.S. Appl. No. 12/116,485 mailed on Jan. 10, 2012.

* cited by examiner

*Primary Examiner* — Jason K. Gee
*Assistant Examiner* — Lisa Lewis
(74) *Attorney, Agent, or Firm* — Lowenstein Sandler LLP

(57) ABSTRACT

In one embodiment, a mechanism for chained output feedback encryption is disclosed. In one embodiment, a method includes generating a keystream at a block cipher encryption module with inputs of a key and the result of an exclusive-or (XOR) operation on two or more previous keystream outputs, and producing ciphertext by combining the generated keystream with plaintext.

20 Claims, 4 Drawing Sheets

US 8,396,209 B2

MECHANISM FOR CHAINED OUTPUT FEEDBACK ENCRYPTION

TECHNICAL FIELD

The embodiments of the invention relate generally to cryptography and, more specifically, relate to chained output feedback encryption.

BACKGROUND

Cryptography is used to hide information. One facet of modern cryptography in computer science utilizes block ciphers to encrypt plaintext. A block cipher operates on blocks of fixed length, often 64 or 128 bits. Because messages may be of any length, and because encrypting the same plaintext under the same key always produces the same output, several modes of operation have been utilized that allow block ciphers to provide confidentiality for messages of arbitrary length.

One of the modes of operation for block ciphers is known as classic output feedback mode (OFB). OFB effectively transforms a block cipher into a synchronous stream cipher. The block cipher is set up to generate a stream of pseudo random bits by iteratively enciphering a block using the output of the previous cycle as the input of the current cycle. Another way to describe OFB is that it generates keystream blocks, which are then XORed with plaintext blocks to create the ciphertext. Because of the symmetry of the XOR operation, encryption and decryption with OFB are exactly the same.

One concern with OFB is that is has a maximum cycle length of 2 to the power of the block size (in bits). As a result, this can be a major concern for encryption with small block sizes. The integrity and confidentiality of the message may be comprised in some cases. Therefore, a mechanism to increase the state size and extend the cycle length using OFB mode would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
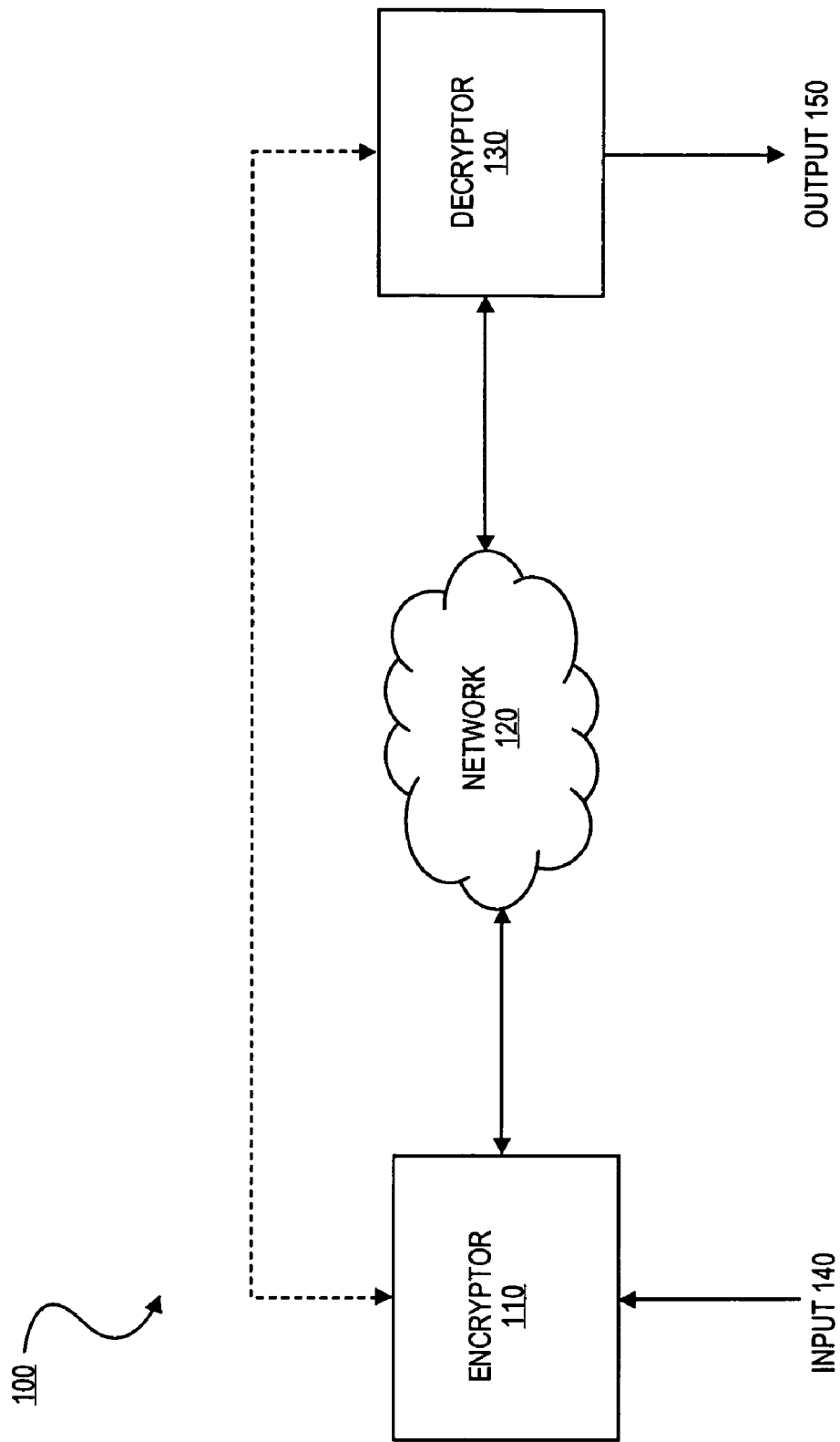
FIG. 1 is a block diagram depicting a system including an encoder and a decoder to perform embodiments of the invention.

Embodiments of the invention provide for a mechanism for chained output feedback encryption. In one embodiment, a method of chained output feedback encryption includes generating a keystream at a block cipher encryption module with inputs of a key and the result of an exclusive-or (XOR) operation on two or more previous keystream outputs, and producing ciphertext by combining the generated keystream with plaintext.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide a mechanism for chained output feedback mode (OFB). FIG. 1 is a block diagram of a cryptography system 100 that performs embodiments of the invention, including chained OFB encryption. System 100 includes an encryptor 110 and a decryptor 130 to perform embodiments of the invention. Encryptor 110 and decryptor 130 may be connected via a network 120 or directly (shown by dashed line). In some embodiments, network 120 may be a LAN, an internet, an extranet, or the Internet.

As shown, encryptor 110 receives an input data stream 140 for encryption. This input data stream 140 may encompass a variety of embodiments, such as a document or an email message. Encryptor 110 encrypts input data stream 140 and sends it to decryptor 130 directly or via network 120. Input data stream 140 may be encrypted for security purposes, etc. Decryptor 130 decrypts the received data stream from encryptor 110, and produces output data stream 150.

Figure 2:
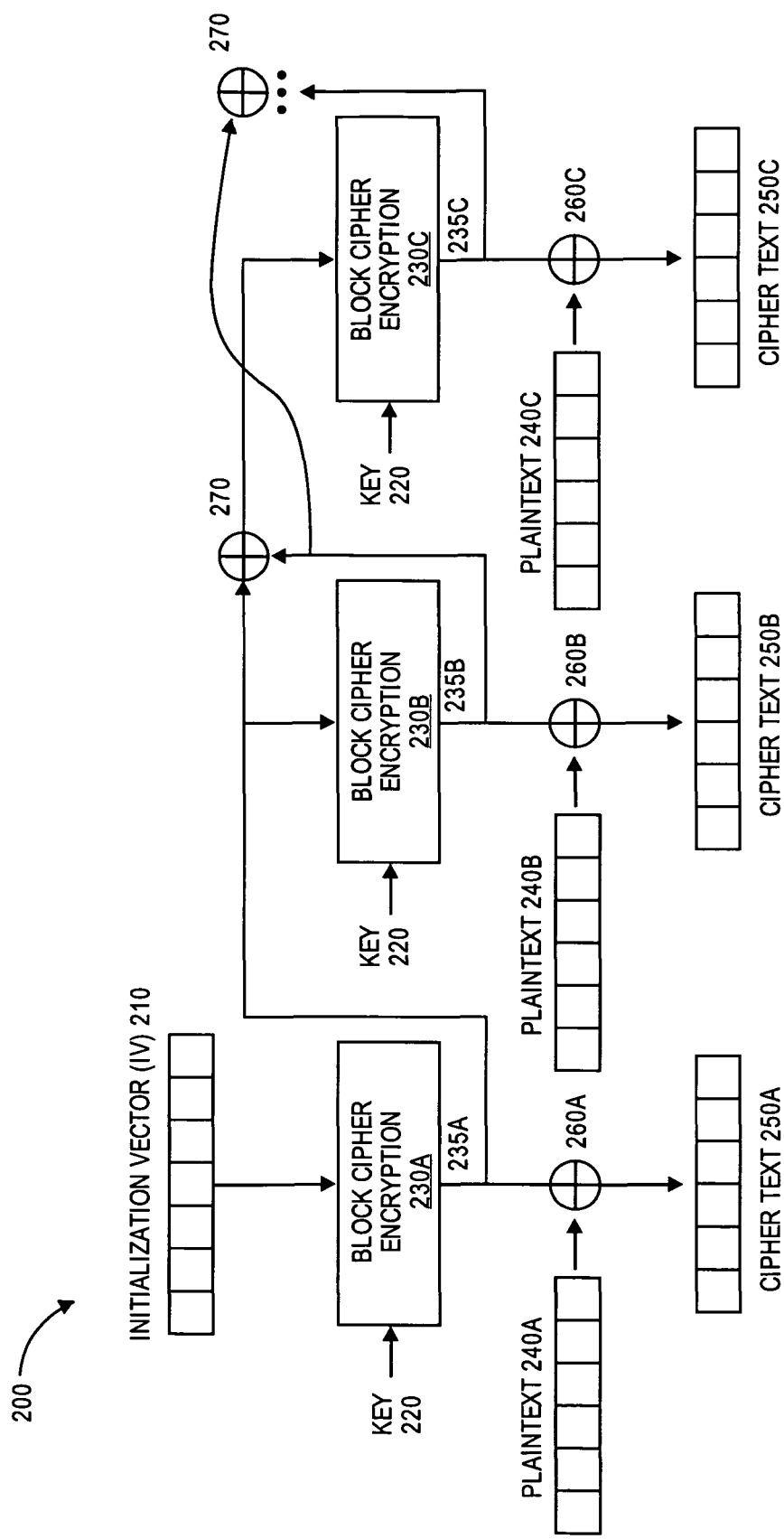
FIG. 2 is a block diagram depicting a chained output feedback mode (OFB) system performing an embodiment of the invention.

FIG. 2 is a block diagram depicting a chained OFB system 200 performing an embodiment of the invention. In one embodiment, system 200 may be part of a cryptography system, such as system 100 described with respect to FIG. 1. According to one embodiment, chained OFB system 200 incorporates feedback from two or more previously generated output blocks, effectively increasing the state and extending the cycle length.

In one embodiment, the chained OFB system 200 operates by initially receiving an initialization vector (IV) 210 and a key 220 into a block cipher encryption module 230a. In one embodiment, the IV 210 and key 220 are secret initial parameters communicated between the endpoints performing the encryption, or they are created by a single endpoint if that endpoint is using the chained OFB system 200 to encrypt data only at that endpoint. Then, the output keystream 235a of block cipher encryption module 230a is exclusive-or'ed (XORed) 260a with plaintext 240a to be encrypted, resulting in ciphertext 250a. The XOR operation is a type of logical disjunction on two operands that results in a value of "true" if and only if exactly one of the operands has a value of "true." In some embodiments, it is envisioned that other functions instead of the XOR function may be applied to the two inputs to produce ciphertext.

In addition, the output keystream 235a from block cipher encryption module 230a is sent on to block cipher encryption module 230b, along with key 220, to output another keystream 235b. Although not specifically depicted, in some embodiments, block cipher encryption module 260a-c may be a single module performing the operations of each of block cipher encryption modules 260a-c.

The output keystream 235b from block cipher encryption module 230b is combined (e.g., XORed) 260b with the next set of plaintext 240b to create ciphertext 250b. In addition, the output keystream 235b from block cipher encryption module 230b is XORed 270 with the output keystream 235a from block cipher encryption module 230a to create an input stream, along with key 220, to block cipher encryption module 230c, and so on until there is no more plaintext to encrypt. The XORing 270 of the multiple keystream elements together to form the input for the next round of the block cipher provides the advantage of increasing block size, and thereby increasing the state and extending the cycle length of the traditional OFB mode. For example, using the previous two keystream results, as depicted in FIG. 2, should about double the block size.

Figure 3:
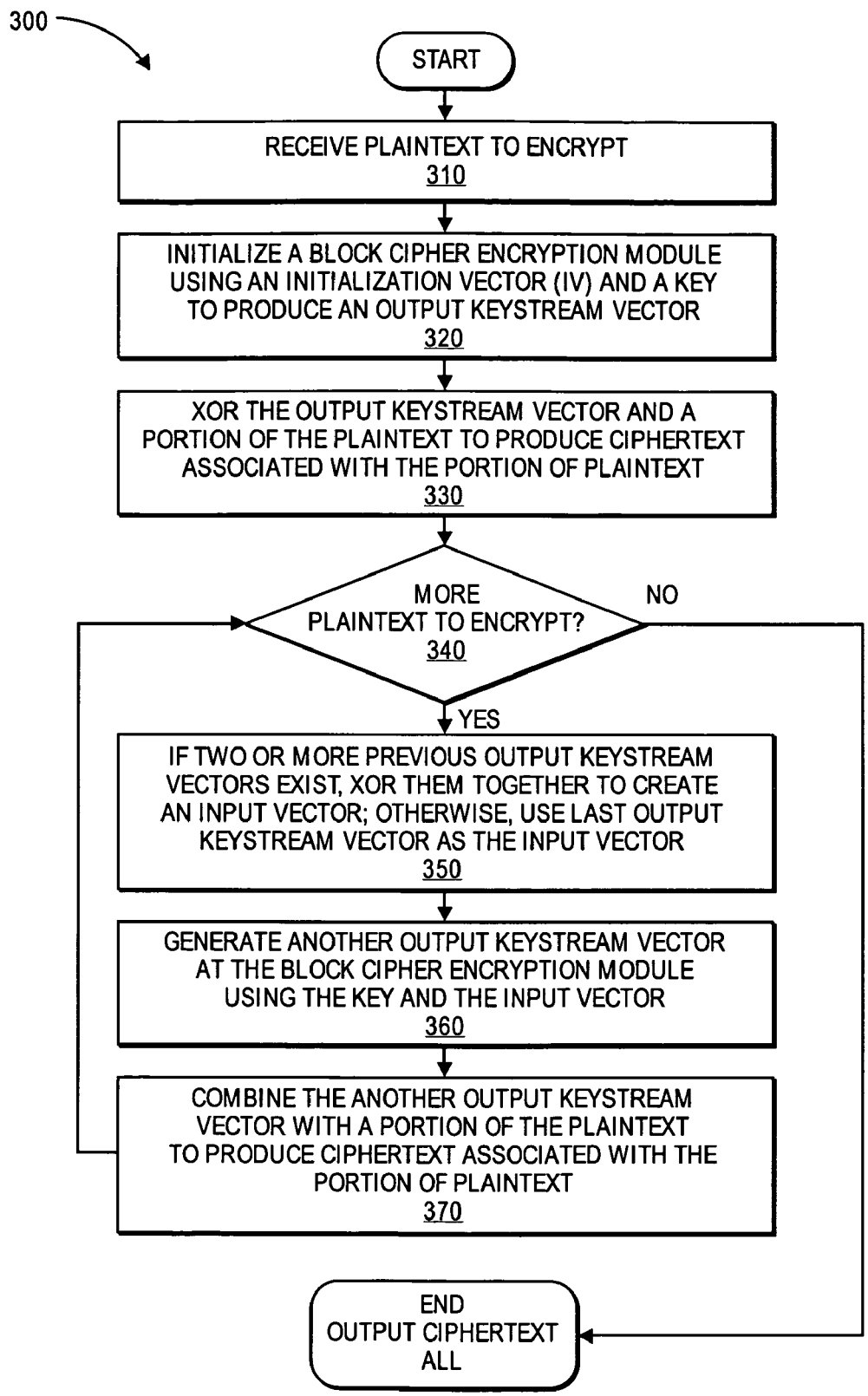
FIG. 3 is a flow diagram illustrating a method for chained OFB encryption according to an embodiment of the invention.

FIG. 3 is a flow diagram illustrating a method 300 for chained OFB encryption according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by chained OFB system 200 of FIG. 2.

Method 300 begins at block 310 where plaintext is received for encryption. Then, at block 320, a block cipher encryption module is initialized using an initialization vector (IV) and a key to produce an output keystream vector. In one embodiment, the IV and key are secret initial parameters communicated between the endpoints performing the encryption, or they are created by a single endpoint if that endpoint is using method 300 to encrypt data solely at that endpoint. The output keystream vector is XORed with a portion of the plaintext to produce ciphertext associated with the portion of plaintext at block 330.

Then, at decision block 340, it is determined whether there is more plaintext to be encrypted. If not, then method 300 ends and the produced ciphertext is output. However, if there is more ciphertext, then embodiments of the invention for chained OFB encryption are utilized in the following blocks. At block 350, if there are two or more previous output keystream vectors from the block cipher encryption module that exist, then these 2 or more vectors are XORed together to produce an input vector. If there is only one previous output keystream vector that exists, then this vector is used as the input vector.

Then, at block 360, another output keystream vector is generated by the block cipher encryption module using the key and the input vector from block 350. At block 370, the output keystream vector is combined with a portion of the plaintext to produce ciphertext associated with the portion of plaintext. In one embodiment, combining the output keystream vector with the portion of plaintext includes XORing the two inputs together to produce the ciphertext. The method 300 returns to decision block 340 and iteratively continues through blocks 350 through 370 until there is no more plaintext to encrypt. When all plaintext has been encrypted, method 300 ends and all of the produced ciphertext is output as the encryption result.

In embodiments of the invention, the maximum cycle length is $2^{m*k}$, where m is the number of previous output blocks that could potentially affect the current block. For example, if an XOR over $K_{i\text{-}20}$ and $K_{i\text{-}33}$ is being used, the m would equal 33 in this case. The maximum number of possible cycles is also $2^{m*k}$, but only if m*k bits of initialization are utilized. So, if a single block is being used for the IV, then the possible cycles will only span $2^k$.

As such, the IV used in embodiments of the invention may span one or more blocks to increase the number of possible starting points for the cycle. Another way to look at this is for any particular block cipher, for each distinct key, with m blocks used in the feedback, there is a single cycle of length $2^{m*k}$, where m is the number of blocks, and k is the number of bits in a block. This cycle consists of $2^m$ instances of each and every one of the $2^k$ possible blocks, in some order that depends on the particulars of the cipher, the key, and the feedback function in use. The purpose of the IV blocks is to determine which point in the cycle is going to be generated as the starting point. The number of possible starting points is equal to the size of the information available in the IV blocks. So, with a single IV block, there are only $2^k$ possible starting points. With 2 blocks, it's $2^{2k}$, etc. In order to "span" the entire cycle, as many IV blocks as you have feedback slots may be needed. In some cases, it is convenient to refer to each of these different starting points as a different cycle.

In some embodiments, as discussed above, the most recent two keystream output results are XORed together to create an ongoing input to the block cipher encryption module. However, embodiments of the invention are not limited to solely the most recent prior two results, and may include more than two results or may utilize results from farther back in the OFB chain than the most recent results. In addition, the function utilized is not necessarily limited to an XOR operation and may be any other operation producing an identical length vector to the input vectors.

For example, in one embodiment, another result might be obtained by keeping a list of past keystream vector results, and using values from further back in the chain than just the most recently obtained values. For example, if the standard or traditional OFB mode generator is represented in an equations such as this:

$$K_i = C(K_{i-1})$$

a different result may be obtained by an equation such as this:

$$K_i = C(K_{i-a} \char`\^ K_{i-b}) \text{ [note:}\char`\^\text{=bitwise XOR]},$$

where a and b correspond to previous keystream vector results stored in a maximal-period linear feedback shift register (LFSR), for example.

Feedback modes used to generate keystreams from block ciphers sometimes run into short cycles. Such a problem may be encountered using embodiments of the invention. In one embodiment, to avoid this result, a counter may be added to the chained OFB mode encryption. The counter is incremented every time a block is generated, and then XORed with the other input(s) to the block cipher encryption module. Incrementing the counter may encompass increasing the value in a linear fashion at each iteration, such as adding 12 to the previous value, for example. However, it is also envisioned that incrementing the counter may encompass something as complex as running it through a linear congruential generator, where the current value is multiplied by a given value, added to another value, and then taken modulus some other value.

Figure 4:
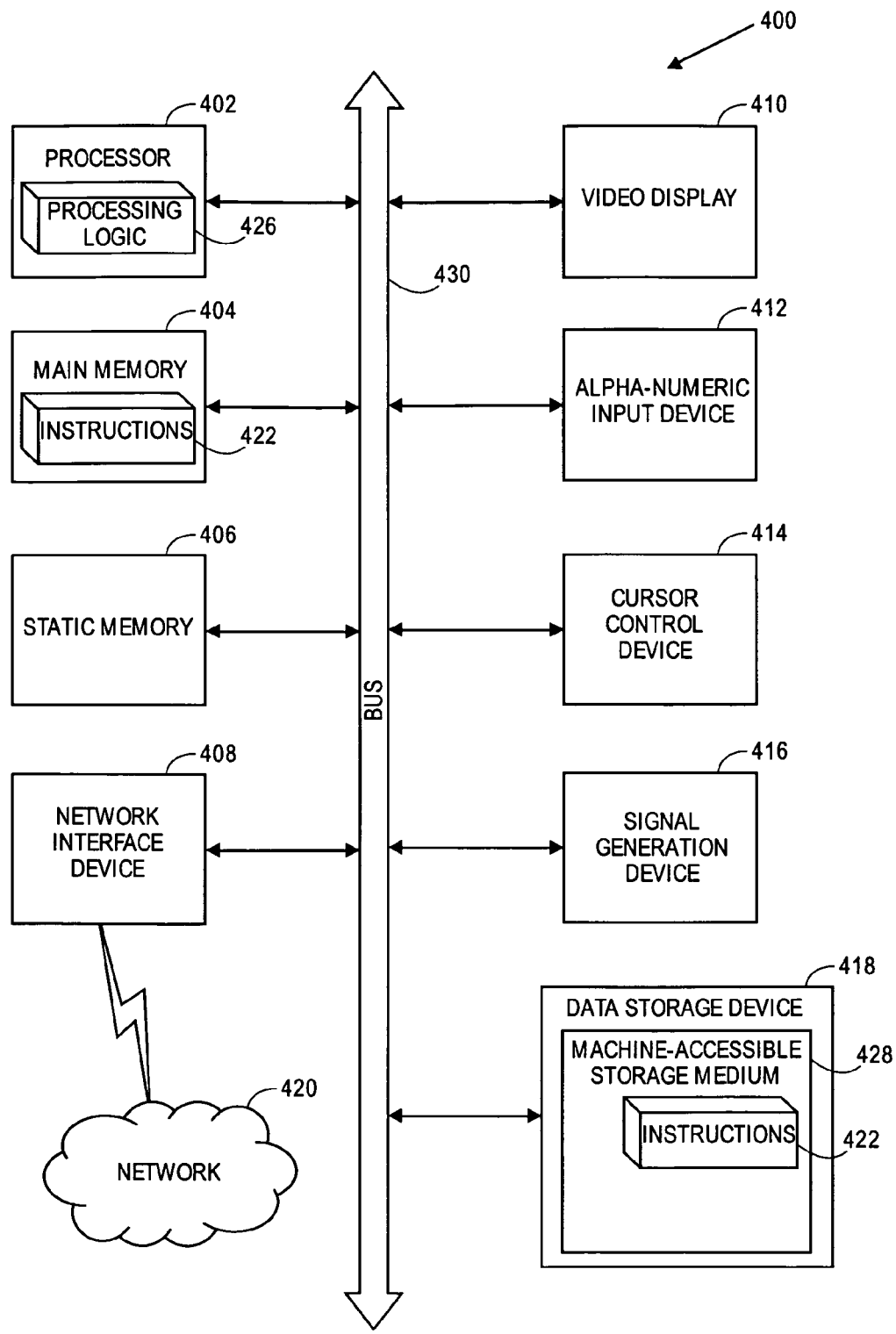
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to perform chained OFB encryption by an encryptor or decryptor (e.g., encryptor 110 or decryptor 130 of FIG. 1), and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
receiving, by an encoder device, a portion of plaintext, a key, and two or more keystreams, the keystreams previously generated by a block cipher encryption module of the encoder device as part of encryption of two or more other portions of the plaintext, wherein the key is a secret parameter that is at least one of created by an endpoint using the encoder device or communicated between two or more endpoints utilizing data encrypted by the encoder device;
performing, by the encoder device, an exclusive-OR (XOR) operation on the two or more keystreams to create an input keystream vector;
generating, by the block cipher encryption module, an updated keystream by combining the key and the input keystream vector; and
producing, by the encoder device, ciphertext by combining the generated updated keystream with the received portion of the plaintext.

2. The method of claim 1, wherein the two or more previously generated keystreams are the most recent previous keystreams generated by the block cipher encryption module.

3. The method of claim 1, wherein the two or more previously generated keystreams comprise keystreams generated by the block cipher encryption module prior to the most recent previously generated keystreams in a chain of keystreams outputted by the block cipher encryption module.

4. The method of claim 1, wherein combining the generated updated keystream with the portion of the plaintext includes performing an XOR operation on the generated updated keystream and the portion of the plaintext to produce the ciphertext.

5. The method of claim 1, wherein generating the updated keystream further comprises combining a counter value with the key and the input keystream vector.

6. The method of claim 5, wherein each time the updated keystream is generated, the counter value is incremented by applying a function to the counter value.

7. The method of claim 6, wherein the function is at least one of an increasing linear function or a linear congruential generator.

8. The method of claim 1, wherein the key and an initialization vector are communicated to the block cipher encryption module prior to the generating the updated keystream, where the initialization vector initializes a first keystream at the block cipher encryption module and is one or more blocks.

9. A system, comprising:
a processing device;
a memory communicably coupled to the processing device to store a plaintext data stream to be encrypted; and
an encoder executable from the memory by the processing device, the encoder configured to:
receive a portion of the plaintext data stream, a key, and two or more keystreams, the keystreams previously generated by a block cipher encryption module of the encoder as part of encryption of two or more other portions of the plaintext data stream, wherein the key is a secret parameter that is at least one of created by an endpoint using the encoder device or communicated between two or more endpoints utilizing data encrypted by the encoder device;
perform an exclusive-OR (XOR) operation on the two or more keystreams to create an input keystream vector;
generate, by the block cipher encryption module, an updated keystream by combining the key and the input keystream vector; and
produce ciphertext by combining the generated updated keystream with the received portion of the plaintext data stream.

10. The system of claim 9, wherein the two or more previously generated keystreams are the most recent previous keystreams generated by the block cipher encryption module.

11. The system of claim 9, wherein the two or more previously generated keystreams comprise keystreams generated by the block cipher encryption module prior to the most recent previously generated keystreams in a chain of keystreams outputted by the block cipher encryption module.

12. The system of claim 9, wherein the encoder to generate an updated keystream further comprises the encoder combining a counter value with the key and the input keystream vector.

13. The system of claim 12, wherein each time the updated keystream is generated, the counter value is incremented by applying a function to the counter value.

14. The system of claim 13, wherein combining the generated updated keystream with the portion of the plaintext data stream includes the encoder to perform an XOR operation on the generated updated keystream and the portion of the plaintext data stream to produce the ciphertext.

15. A non-transitory machine-readable storage medium including data that, when accessed by a machine, cause the machine to perform operations comprising:
receiving, by an encoder device comprising the machine, a portion of plaintext, a key, and two or more keystreams previously generated by a block cipher encryption module of the encoder device as part of encryption of two or more earlier portions of the encrypted plaintext, wherein the key is a secret parameter that is at least one of created by an endpoint using the encoder device or communicated between two or more endpoints utilizing data encrypted by the encoder device;
performing, by the encoder device, an exclusive-OR (XOR) operation on the two or more keystreams to create an input keystream vector;
generating, by the block cipher encryption module, an updated keystream by combining the key and the input keystream vector; and
producing, by the encoder, ciphertext by combining the generated updated keystream with the portion of the plaintext.

16. The non-transitory machine-readable storage medium of claim 15, wherein the two or more previously generated keystreams are the most recent previous keystreams generated by the block cipher encryption module.

17. The non-transitory machine-readable storage medium of claim 15, wherein the two or more previously generated keystreams comprise keystreams generated by the block cipher encryption module prior to the most recent previously generated keystreams in a chain of keystreams outputted by block cipher encryption module.

18. The non-transitory machine-readable storage medium of claim 15, wherein generating the updated keystream further comprises combining a counter value with the key and the input keystream vector.

19. The non-transitory machine-readable storage medium of claim 18, wherein each time the updated keystream is generated, the counter value is incremented by applying a function to the counter value.

20. The non-transitory machine-readable storage medium of claim 15, wherein combining the generated updated keystream with the portion of the plaintext includes performing an XOR operation on the generated updated keystream and the portion of the plaintext to produce the ciphertext.

* * * * *